Patented Jan. 17, 1933

1,894,374

UNITED STATES PATENT OFFICE

CARL C. KESLER, OF CEDAR RAPIDS, IOWA, ASSIGNOR TO PINE INSTITUTE OF AMERICA INCORPORATED, OF JACKSONVILLE, FLORIDA, A CORPORATION OF DELAWARE

VARNISH

No Drawing. Original application filed July 30, 1925, Serial No. 47,123. Divided and this application filed September 6, 1929. Serial No. 390,862.

My invention relates to improvements in the composition of varnish. This application is a division from an application filed by me July 30, 1925, Serial No. 47,123, for improvements in rosin soap.

Rosin is a substance of wide industrial utility, but, because of certain characteristics, it serves imperfectly some purposes for which it is used. In varnish-making, for example, rosin is a useful substance. But because of the presence of the abietic acid present in rosin, the varnish which contains it deteriorates rapidly.

I begin with the rosin of commerce and by preliminary treatment bring about chemical change, remove the abietic acid component, and have left the resene in substantially pure condition. The so liberated resene, being a neutral gum with enhanced drying properties, serves as a valuable constituent of varnishes. And varnishes compounded with resene so liberated will not deteriorate in the manner alluded to.

In the practice of my invention, and beginning with the rosin of commerce, I first, by the known means of acid treatment or heat, isomerize the material. Specifically, by heating the rosin to a temperature of 300° C. and maintaining it at that temperature, isomerization may be effected. Or, again, if the rosin be melted, and if while it remains in liquid condition a slow current of hydrochloric acid gas be caused to pass through it, isomerization will be effected. If while such acid treatment is in progress stirring be resorted to, or other means for effecting more intimate contact of the substances so brought into association, isomerization may be effected in about fifteen minutes.

Having effected isomerization of the rosin, I dissolve it in a suitable solvent, such as ethyl alcohol, methyl alcohol, or other alcohol, and to the solvent either before or after solution I add sodium hydroxide, or other alkali, in the amount of one-fourth of the equivalent weight of the rosin under treatment. A convenient degree of concentration of the sodium hydroxide employed would be a forty per cent aqueous solution, but it will be understood that the degree of concentration does not enter into the essence of the invention, and the degree of concentration may in fact vary indefinitely. The sodium hydroxide may be added to the solution in any suitable precipitating tank fitted with steam coils for heating and with agitators for stirring. After the addition the material is allowed to stand for a short time, until the reaction and precipitation are complete. The material being stirred is mobile enough to be pumped.

The material then is carried to a filter press, where the precipitate is separated. The filtrate which passes on carries with it in solution the resene, and this substance may now be recovered free of abietic acid compounds.

The precipitate which remains in the filter press may by pressure and by continued washing with the solvent be made to give up substantially all traces of resene, and the resene bearing solvent may be added to the liquid from which the precipitate initially was separated. The liquid so obtained is a solution of resene, and the solvent being removed in suitable manner, ordinarily by distillation, substantially pure resene remains.

The resene so obtained is now combined with the oils, gums, or such materials as are commonly employed in varnish making. The varnish so produced is of superior quality, no longer subject to early deterioration.

I claim as my invention:

1. The method herein described of preparing a material for use in varnish making which consists in removing from rosin its abietic-acid component and recovering the remaining resene component.

2. The method herein described of preparing a material for use in varnish making which consists in isomerizing rosin, dissolving the isomerized rosin, subjecting the solution to alkaline reaction, and separating the resulting precipitate, removing from the filtrate the solvent.

In testimony whereof I have hereunto set my hand.

CARL C. KESLER.